United States Patent

[11] 3,623,095

[72] Inventors Lucien Gerardin
 Jacques Leger,
 Boulogne-sur-Seine, both of France
[21] Appl. No. 459,537
[22] Filed May 26, 1965
[45] Patented Nov. 23, 1971
[73] Assignee Compagnie Francaise Thomson Houston-
 Hotchkiss Brandt, Paris, France
[32] Priority June 2, 1964
[33] France
[31] 976,768

[54] PULSE RADAR SYSTEM
 9 Claims, 5 Drawing Figs.

[52] U.S. Cl. .................................................. 343/7.7,
 343/17.1
[51] Int. Cl. ..................................................... G01s 9/42,
 G01s 7/28
[50] Field of Search ........................................... 343/17.1,
 100.7, 7.7

[56] References Cited
 UNITED STATES PATENTS
 3,267,467 8/1966 Gerardin et al. ............... 343/7.7
 3,495,242 2/1970 Dickey ........................ 343/7.7

*Primary Examiner*—T. H. Tubbesing
*Attorney*—Karl F. Ross

CLAIM: 1. In a radar system having transmitting means for sending out pairs of uniformly spaced pulses of high-frequency wave energy during successive repetition periods and receiving means for producing echo pulses in response to reflections of said pulses from outlying objects, said receiving means including a first channel for conveying said echo pulses, a second channel for conveying said echo pulses with a delay relative to said first channel equaling the spacing of the pulses in each pair, and phase-discriminator means connected to receive echo pulses from both said channels for deriving therefrom a signal dependent in its magnitude upon the phase relationship of a delayed first echo pulse and a concurrently arriving undelayed second echo pulse, the combination therewith of control means connected to said phase-discriminator means for comparing the phase relationships of corresponding pairs of coincident echo pulses during consecutive repetition periods, and circuit means responsive to said control means for transmitting said signals to a load as a moving-target indication only upon the degree of correlation of said coincident echo pulses during consecutive repetition periods exceeding a predetermined threshold value.

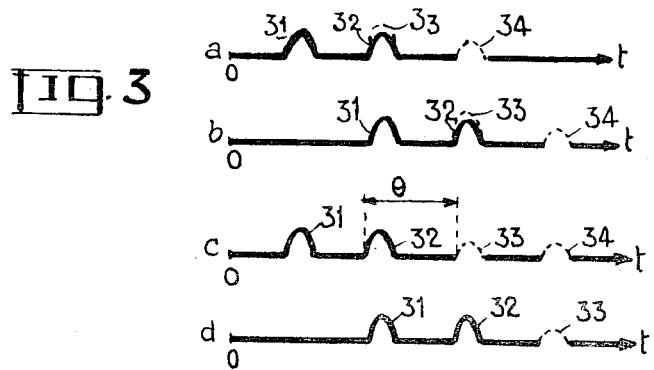
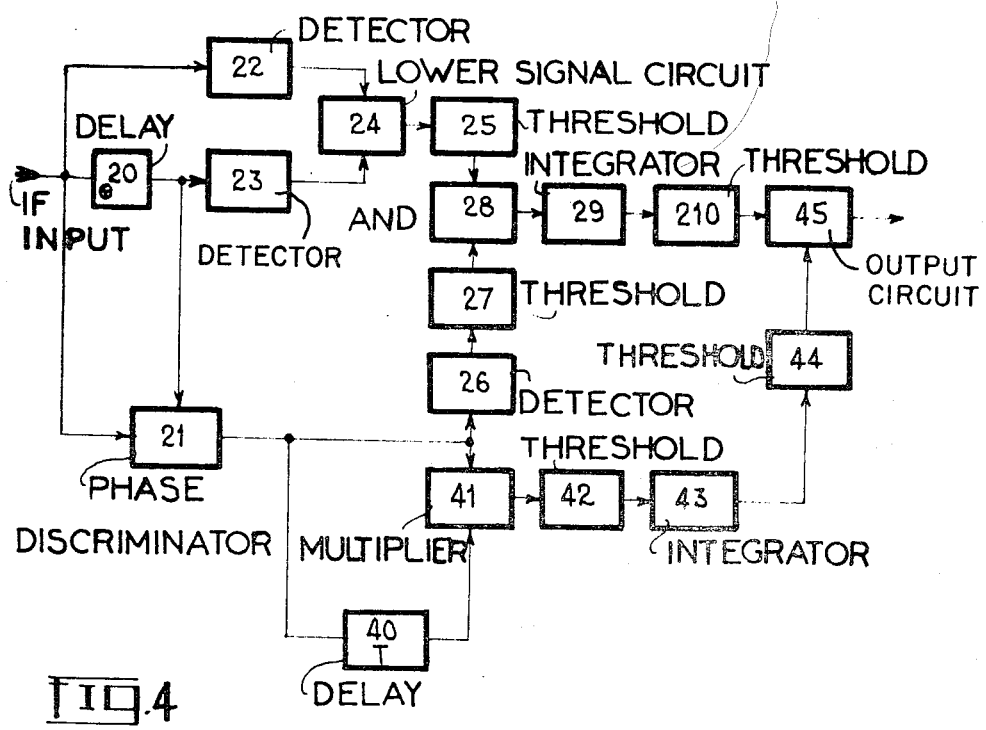

PULSE RADAR SYSTEM

The present invention relates to pulse radar systems of the moving-target-indicator (MTI) type and concerns more particularly the elimination of fixed-target echoes in pulse radar equipment of the type in which two pulses are consecutively transmitted at each repetition period, such equipment being known as twin-pulse or double-pulse radar.

The fixed-target echoes which are to be suppressed by the equipment according to the invention are more particularly to those returning from small metallic and consequently reflecting foils, known as chaff or windows, which are released in the atmosphere to simulate real aircraft targets and thereby confuse the military radar defenses.

Conventional devices for eliminating fixed-target echoes, operating with the so-called twin or double-pulse radar, are capable of discriminating between targets moving at a great radial velocity, such as aircraft, and the fixed targets or objects traveling at a low radial velocity such as chaff whose radial velocity is that of the wind. These devices are furthermore able to operate with radar equipment in which there is a random jump of the transmission frequency from one repetition period to the next.

In the so-called twin-pulse radar systems, there occurs a transmission during each repetition period of two pulses which have the same carrier frequency and width and which are spaced a given time interval $\theta$ apart. Two types of twin-pulse radars are known, i.e. with short and with wide spacing. In the short-spacing twin-pulse radar, the interval $\theta$ is chosen of a relatively small value to provide an optimum amplitude-frequency response of the receiver for the radial velocities of the observed targets but the reception is, in that case, spoiled by spurious echoes generated by the so-called contamination process, which will be explained hereinbelow. In the wide spacing twin-pulse radar, the interval $\theta$ is chosen of a value great enough to reduce the effects of the contamination but, in that case, the amplitude-frequency response of the receiver is no longer an optimum for the radial velocities of the observed targets.

By contamination, which, in the short-spacing twin-pulse MTI systems generates spurious echoes considerably reducing the effectiveness of the receiver, is meant the reception of coincident echoes or also of echoes spaced $\theta$ apart, said echoes being returns from passive reflectors of different portions of the chaff cloud. Unfortunately the conventional double-pulse MTI systems cannot distinguish between these spurious echoes and those from so-called useful targets such as aircraft, for instance.

The main object of the present invention is to provide means for reducing the contamination effects caused by the chaff echoes.

Another object of the invention is the provision of a device able to select, among all the signals detected within each repetition period, by a twin-pulse MTI device, those having a correlation function exceeding a given threshold.

Another object of the invention is the provision of a device capable of performing the calculation of the correlation function of the output signals of the phase discriminator of the MTI receiver.

Another object of the invention is the provision of a device capable of comparing the calculated correlation function with a given threshold, and thereby suppressing the output of the receiver when the correlation function of the detected signals does not exceed said given threshold.

These and further objects of the invention will become apparent from the following specification and the accompanying drawing in which:

FIG. 2b shows graphs of signals at various points of the device of FIG. 2a;

FIG. 3 shows the contamination effects;

FIG. 4 is a block diagram of the system according to the invention.

Figure 1:
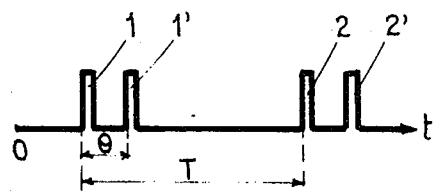
FIG. 1 shows the shape of the transmitted pulses.

FIG. 1 shows the shape of the pulses transmitted in a twin-pulse radar. These pulses 1, 1' and 2, 2' are consecutively transmitted during each repetition period of duration T. The pulses 1, 1' or 2, 2' of each pair are identical with each other, having the same width and carrier frequency, and are spaced apart a time interval $\theta$. The system associated with the above-described type of transmitter, designed to eliminate echoes from fixed targets, discriminates between the fixed-target and moving-target echoes by determining the difference between the amplitudes and/or the phase angles of the received twin echoes corresponding to the transmitted twin pulses.

In the short-spacing systems for the elimination of fixed-target echoes, time interval $\theta$ is so chosen that the frequency (one-half $\theta$) which corresponds to the first maximum of the amplitude-frequency response of the receiver coincides with the mean Doppler frequency of the targets. Under these conditions, chaff echoes are properly eliminated but, as noted above, if the chaff cloud produces returns of a duration greater than $\theta$, spurious echoes from contamination are received by reason of the coincidence of two echoes, staggered by $\theta$, from two different portions of the chaff cloud.

In the wide-spacing systems for the elimination of fixed-target echoes, time interval $\theta$ is, on the other hand, so much greater than the total duration of the echoes from the chaff cloud that practically the contamination is prevented. But, under these conditions, $\theta$ has no longer the value to optimize the amplitude-frequency response of the receiver to the targets. The reasons are the occurrence of several blind speeds within the range of the radial target velocities and as the first blind speed corresponding to a frequency $1/\theta$ is too low with respect to the mean radial chaff velocity, the twin echoes from chaff are little correlated so as to result in a false response of the receiver to the chaff.

Figure 2A:
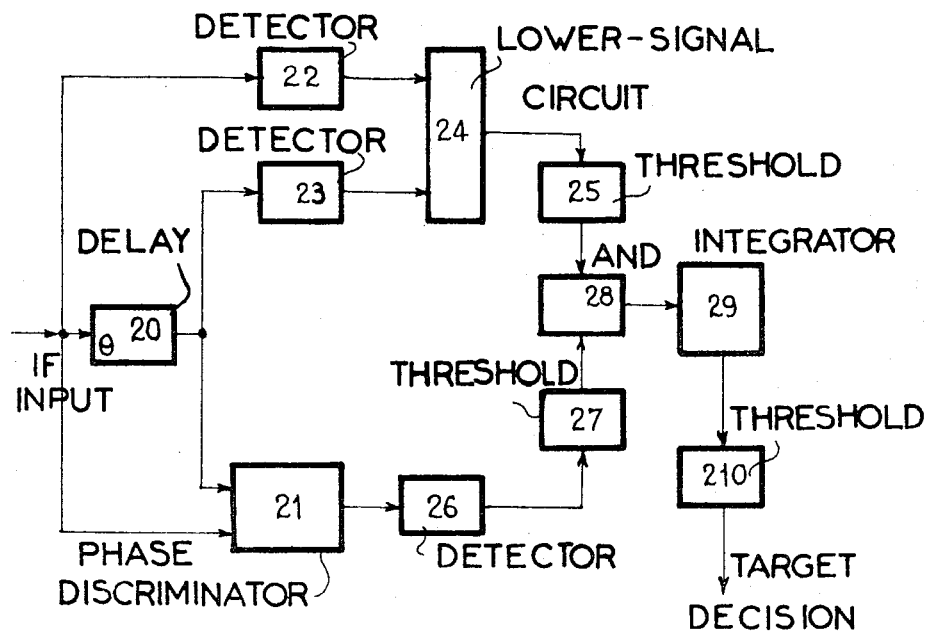
FIG. 2a represents the block diagram of a conventional double-pulse MTI device.

FIG. 2a represents a conventional twin-pulse MTI device wherein the discrimination between target and chaff echoes is performed by detecting the phase-angle difference. The description of this known system will enable those skilled in the art to better appreciate and understand the improvements afforded by the present invention.

As shown in FIG. 2a, the IF signals are received at the IF input and applied to a delay circuit 20 on the one had, wherein they are delayed by $\theta$, and simultaneously to a detector 22 and a phase discriminator 21 on the other hand. The direct and delayed IF signals are both conveyed to a phase discriminator 21 of a known type which delivers a video-signal function of the phase-angle difference of the received twin signals, that is, a function of the radial velocity of the detected obstacle. An amplitude-discriminating channel is also provided in the system for the purpose of eliminating the noise signals, whose phase angles vary at random and which provide at the output of the phase discriminator a high false-alarm probability. Thus, the direct and delayed IF signals are detected in detectors 22 and 23 respectively and fed to a single lower-signal circuit 24, which selects at its output lower amplitude from the two signals applied to its inputs. This signal of lower amplitude is then conveyed to a limiter circuit 25 having an output only if the signal applied to it exceeds its threshold. The signal issuing from discriminator 21 is rectified in a circuit 26, then applied to a limiter device 27 which discriminates with reference to amplitude in the same manner as device 25. The signals delivered respectively by the phase and amplitude channels, whose outputs are circuits 25 and 27 feed into an AND circuit 28.

Figure 2B:
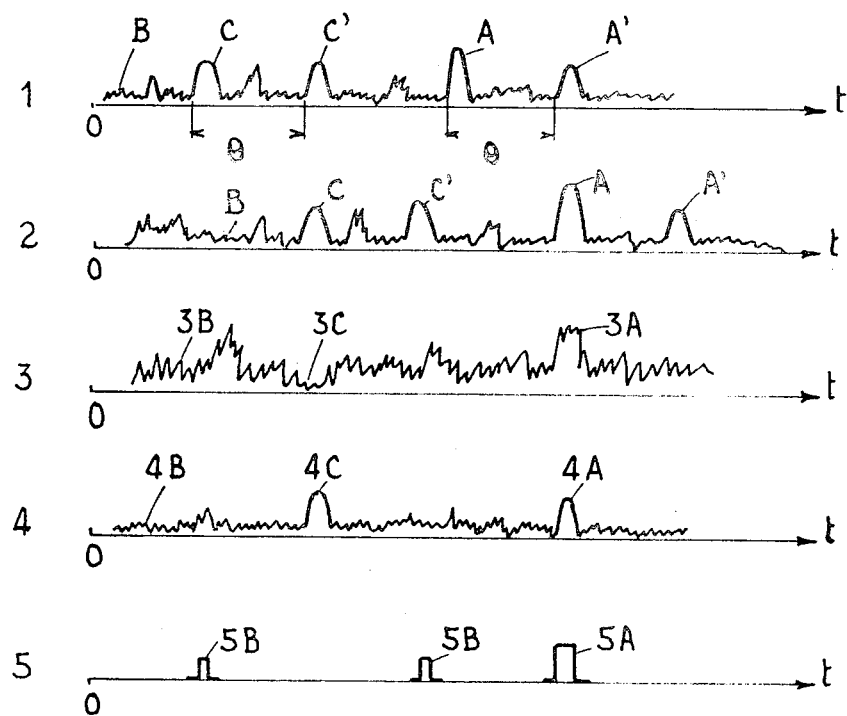

FIG. 2b illustrates the operation of the above-described device of FIG. 2a. Graph 1 of FIG. 2b represents the video envelope of the input signals. They consist, for instance, of two pairs of twin echoes A and A' coming from a moving target, such as an aircraft, and C and C', coming from a chaff cloud. The signal B representing a noise signal is naturally always present. These signals represented by curve 1 are the signals propagating through the direct channel. The graph 2 of FIG. 2b represents the signals propagating through the delayed channel, said signals being delayed by $\theta$ with respect to those of curve 1, as is readily apparent. The curve 3 represents the output of phase discriminator 21. It may be noticed on this graph 3 that the noise signal B generates a signal which varies in a random fashion and whose level may be high. The chaff echoes C and C' being slightly dephased produce a low signal 3C. On the other hand, the aircraft echoes A and A' produce a high-level signal 3A. It follows from the consideration of this graph 3 of FIG. 2b that there is a need for eliminating the noise signals which, owing to their relatively high level, may cause false alarms. Now, the lower-signal circuit 24 delivers signals, like those of graph 4 of FIG. 2b, which comprise a noise signal 4B whose amplitude is markedly reduced with respect to that of the noise B of graph 1 since it is equal to the lowest amplitude of the noise signal propagating through either the direct or the delayed channel. Circuit 24 delivers also a signal 4C corresponding to the chaff echoes and having the same amplitude as they and a signal 4A corresponding to the echoes A and A' but of an amplitude equaling the lower of the two, i.e. of signal A'. Owing to the noise reduction in the amplitude channel and to the thresholds 25 and 27, there exists at the output of AND circuit 28 only a pulse 5A, corresponding to the target echoes A and A', which may be in some cases accompanied by lower noise pulses 5B, as shown in graph 5 which represents the output of this AND circuit 28. Let N be the number of repetition periods during which the radar equipment radiates in a given direction. With such operating conditions, the signal issuing from circuit 28 is integrated over N periods in an integrator 29 and applied to limitor 210 (FIG. 2a) connected to this integrator, the latter producing a target indication if the amplitude of the integrated signal from circuit 29 exceeds a given threshold which is naturally so chosen as to eliminate the noise pulses 5B. As the chaff has a low radial velocity it produces low-amplitude signals at the output of the phase discriminator. At each repetition period, there will be a low probability for the threshold 27 to be exceeded and thus a low probability of false alarms in response to chaff at the output of the receiver. Yet for a useful target at a high radial velocity, there will be a high probability of the signal amplitude clearing the threshold 27 and, therefore, a high detection probability at the output of the receiver.

With specific reference to devices of the short-spacing type for the elimination of fixed-target echoes, we shall now describe the contamination echoes occurring in devices of this kind.

A particular type of contamination, called the $\pm\theta$ type, occurs when the total duration of the echoes returning from the chaff cloud is greater than $\theta$, a second type of contamination, called the $\pm 2\theta$ type, occurs when this duration is greater than $2\theta$.

The curves (a) and (b) of FIG. 3 show the effects of the contamination of the $+\theta$ type. The pairs of pulses 31, 32 and 33, 34 appearing on curve (a) represent two pairs of twin chaff echoes which are received within a given repetition period. The contamination is due to the coincidence, upon reception, of the echoes 32 and 33 returning from two different portions of the chaff cloud, these echoes being thus uncorrelated. Curve (b) represents the same pulses delayed by $\theta$. In the direct and delayed channels, there is thus coincidence between the signals 31 and (32+33) on the one hand and between the signals (32+33) and 34 on the other hand. Each of these pairs of signals produces at the output of the phase discriminator, a signal known as contamination and due to the partial uncorrelation of signals 31, (32+33) on the one hand and (32+33), 34 on the other hand. Each of these contamination signals produces a spurious signal at the output of a conventional twin-pulse MTI device. Curves (c) and (d) show the effects of the contamination of the $+2\theta$ type. This contamination occurs when the two pairs of twin chaff echoes, 33–34 and 31–32, corresponding to one and the same pair of transmitted twin pulses are such that echoes 32 and 33 are spaced $\theta$ apart. The direct signals are shown on curve (c) of FIG. 3 and the signals delayed by $\theta$ are partly represented on curve (d) It is thus easy to see that contamination occurs by the coincidence of pulse 33 of the direct channel with pulse 32 of the delayed channel. These echoes return from different portions of the chaff cloud and thus are not correlated, producing, at the output of the phase discriminator, a contamination signal which is similar to a noise signal, and therefore of a high level. As the signal at the output of the amplitude channel is also of high level, it results that the contamination produces a strong spurious signal as the output of the twin-pulse MTI device.

It is, accordingly, the purpose of the present invention to describe and claim a device for eliminating all the signals caused by contamination which may appear in a double-pulse MTI device.

The process of elimination of the contamination signals which is to be used in the device according to the invention is based on the following consideration. The total or partial uncorrelation between the coincident signals producing a contamination entails a total or partial uncorrelation between the signals due to contamination appearing at the output of the phase discriminator and corresponding to the successive recurrent illuminations of the chaff cloud. Indeed, the contamination is provoked by the coincidence of signals owing to, partly at least, echoes returning from two different portions of the chaff cloud and the contamination signal obtained as an output of the phase discriminator is a function of the phase shift between the echoes returning from these two portions of the chaff cloud.

As the transmitting frequency of the radar is randomly varied from one period of repetition to the next, the phase shift is also randomly varying and the contamination signals obtained as outputs of the phase discriminator are not correlated over successive repetition periods. The signals corresponding to the echoes of useful targets remain correlated since these targets are practically pinpoints and too much scattered to produce contamination.

The device according to the invention is arranged to calculate at least an approximate value of the correlation function F of the output signals of the phase discriminator over two successive repetition periods and to suppress the output signal of an associated conventional twin-pulse MTI device when the corresponding correlation function is too low. An embodiment of such an improved device according to the invention is shown in FIG. 4. It is associated with a device similar to that shown in FIG. 2a, the same reference numerals being used for the circuits performing same functions. The approximate calculation of the correlation function F is achieved by multiplying the signals obtained over two successive repetition periods, and then integrating the so-obtained signals over N repetition periods, N being the number of useful illuminations in a given direction, during a full revolution of the radiating beam of the antenna. N may also be defined as the number of repetition periods during this complete revolution of the antenna. The signals issuing from circuit 21 are delayed in a delay line 40 which imparts to them a delay T of one repetition period, and the directly conveyed signals together with the delayed ones arrive at respective inputs of a multiplier 41. The signals appearing at the output of multiplier 41 are integrated over N repetition periods in a circuit 43. This circuit produces a signal which represents the approximate value of the correlation function to be calculated and which is compared in a circuit 44 with a threshold for making a decision about the contamination, this decision being positive if the signal is lower than said threshold. The device 44 inhibits in this case an output circuit 45 which blocks the transmission of the signals to a load which would otherwise receive a moving-target indication.

The system according to the invention associated with a conventional short spacing twin-pulse MTI device has now been described; in connection with this system it may be considered as advantageous to use a digital integrator instead of the conventional one designated 43. The digital circuit used for that purpose may be a computer which is capable of performing in addition some functions carried out by corresponding circuits in the associated MTI device.

To feed this computer, the output signals from multiplier 41 are amplitude sampled in a limiter device 42. As noted above, the computer performs some functions of integration of the associated conventional double-pulse MTI device, including the circuits 28, 29, 210, 43, 44 and 45 (FIG. 4). Furthermore if the delay T in circuit 40 is difficult to obtain by analogue techniques, it may be easier to do so by digital techniques known per se and, for that purpose, the output signals of the phase discriminator 21 are quantized by appropriate means and the computer performs the operations "delay T" and "-multiplication" which otherwise are to be made in circuits 40 and 41.

In the case where the signals are quantized in binary form, the computer may supply the kind of information obtained at the outputs of the aforedescribed circuits now included in the computer. For each time quantum, the bits to be conveyed are the following when, first, the delay line 40 is not digitalized:

at the output of threshold 25, one bit making the decision about the echo;
at the output of AND circuit 28, one bit making the decision about the target before integration;
at the output of threshold 42, one bit making the decision about the contamination before integration;
at the output of threshold 210, one bit making the provisional decision about the target;
at the output of threshold 44, one bit making the final decision about the contamination.

If the delay T is established in digital form, there must further be conveyed two bits for making the decision about the target velocity at the output of phase discriminator 21.

After having considered in the foregoing the case of the short-spacing double-pulse MTI devices, we shall now consider the case of the wide-spacing double pulse MTI devices. With the latter pulse system it is also possible to have spurious echoes which are difficult to cancel by conventional double-pulse MTI devices. Indeed, consider two chaff bundles at like distance from the radar and simultaneously illuminated. These bundles are not at the same height generally and have therefore different radial velocities, owing to the relatively high gradient of the wind velocity as a function of elevation. The corresponding signal as received by the radar receiver consists of the sum of the signals returning from each bundle. In the case of wide-spacing system, the chaff Doppler frequencies, which correspond to the current wind velocities, are located within a band wherein the amplitude-frequency response of the receiver is relatively high; it appears then necessary to make a correction about the wind at the reception to shift the chaff Doppler spectrum towards the zero frequencies. Yet when there is a simultaneous reception of echoes returning from two chaff bundles, the wind correction enables the elimination of only one of the received echoes. At the output of the conventional twin-pulse MTI device there still exist strong spurious echoes corresponding to the returns from one of the chaff bundles which are detected as moving targets. Nevertheless, owing to the fact that the transmitting frequency of the radar is randomly varied, the corresponding signals at the output of the phase discriminator are little correlated from one period of repetition to the next, and the device according to the invention may still be used in this case to eliminate such echoes.

The above description relates only to one particular example of the system according to the invention which should not be considered as limited to it. Any other embodiment which does not depart from the principles of the invention as claimed below should be considered as coming within the scope of the present invention.

What we claim is:

1. In a radar system having transmitting means for sending out pairs of uniformly spaced pulses of high frequency wave energy during successive repetition periods and receiving means for producing echo pulses in response to reflections of said pulses from outlying objects, said receiving means including a first channel for conveying said echo pulses, a second channel for conveying said echo pulses with a delay relative to said first channel equaling the spacing of the pulses in each pair, and phase-discriminator means connected to receive echo pulses from both said channels for deriving therefrom a signal dependent in its magnitude upon the phase relationship of a delayed first echo pulse and a concurrently arriving undelayed second echo pulse, the combination therewith of control means connected to said phase-discriminator means for comparing the phase relationships of corresponding pairs of coincident echo pulses during consecutive repetition periods, and circuit means responsive to said control means for transmitting said signals to a load as a moving-target indication only upon the degree of correlation of said coincident echo pulses during consecutive repetition periods exceeding a predetermined threshold value.

2. The combination defined in claim 1 wherein said control means comprises multiplier means having a first input connected directly to the output of said phase-discriminator means and a second input connected to said output via a delay path having a delay time equal to the length of a repetition period.

3. The combination defined in claim 2 wherein said control means further comprises integrator means connected to said multiplier means for integrating the output of the latter over a multiplicity of repetition periods.

4. The combination defined in claim 3 wherein said transmitting means comprises a rotating directive antenna, said multiplicity of repetition periods corresponding to the number of such periods during one revolution of said antenna.

5. The combination defined in claim 3 wherein said control means further includes first threshold means between said multiplier means and integrator means and second threshold means connected to the output of said integrator means.

6. The combination defined in claim 1 wherein said circuit means comprises detector means connected to the output of said phase-discriminator means, threshold means connected to the output of said detector means, and an output circuit connected to receive said signals from said detector means, said control means being coupled to said output circuit for blocking same upon insufficient correlation of said coincident echo pulses.

7. The combination defined in claim 6 wherein said circuit means further comprises first and second detectors respectively connected to said first and second channels, selector means for choosing lower-amplitude pulses from the outputs of said first and second detectors, and gating means connected to said detector means and selector means for passing a signal to said output circuit only upon the outputs of said selector means and said detector means each exceeding a predetermined threshold value.

8. The combination defined in claim 1 wherein said transmission means includes a source of carrier wave randomly changing in frequency from one repetition period to the next.

9. The combination defined in claim 1 wherein said control means includes a digital computer.

* * * * *